United States Patent
Noble, Jr. et al.

(10) Patent No.: US 8,488,769 B1
(45) Date of Patent: Jul. 16, 2013

(54) NON-SCHEDULED TRAINING FOR AN AGENT IN A CALL CENTER

(75) Inventors: James K. Noble, Jr., Marietta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/454,841

(22) Filed: Apr. 24, 2012

(51) Int. Cl.
H04M 3/00 (2006.01)
H04M 5/00 (2006.01)

(52) U.S. Cl.
USPC ............ 379/265.02; 379/265.03; 379/265.04; 379/265.05

(58) Field of Classification Search
USPC ................. 379/265.02, 265.12, 242, 265.05, 379/265.03, 265.04, 265.06; 707/822
See application file for complete search history.

(56) References Cited

U.S. PATENT DOCUMENTS

| | | | |
|---|---|---|---|
| 5,270,920 A | 12/1993 | Pearse et al. | |
| 6,157,808 A | 12/2000 | Hollingsworth et al. | |
| 6,170,014 B1 | 1/2001 | Darago et al. | |
| 6,301,573 B1 | 10/2001 | McIlwaine et al. | |
| 6,324,282 B1 | 11/2001 | McIllwaine et al. | |
| 6,459,787 B2 | 10/2002 | McIllwaine et al. | |
| 6,628,777 B1 | 9/2003 | McIllwaine et al. | |
| 6,775,377 B2 | 8/2004 | McIllwaine et al. | |
| 7,043,193 B1 | 5/2006 | Vashi et al. | |
| 7,158,628 B2 | 1/2007 | McConnell et al. | |
| 7,174,010 B2 | 2/2007 | McIlwaine et al. | |
| 7,660,407 B2 | 2/2010 | Fama | |
| 7,801,055 B1 | 9/2010 | Blair | |
| 7,801,295 B2 | 9/2010 | Patel et al. | |
| 7,826,608 B1 | 11/2010 | Peleg | |
| 8,108,237 B2 | 1/2012 | Bourne et al. | |
| 8,112,306 B2 | 2/2012 | Lyerly et al. | |
| 8,117,064 B2 | 2/2012 | Bourne et al. | |
| 8,402,070 B2 * | 3/2013 | Szlam et al. | 707/822 |
| 2004/0165717 A1 | 8/2004 | McIlwaine et al. | |
| 2004/0202308 A1 | 10/2004 | Baggenstoss | |
| 2004/0202309 A1 | 10/2004 | Baggenstoss et al. | |
| 2005/0175971 A1 | 8/2005 | McIlwaine et al. | |
| 2006/0072739 A1 | 4/2006 | Baggenstoss et al. | |
| 2006/0111953 A1 | 5/2006 | Setya | |
| 2006/0233346 A1 | 10/2006 | McIlwaine et al. | |
| 2006/0256953 A1 | 11/2006 | Pulaski et al. | |
| 2006/0256954 A1 * | 11/2006 | Patel et al. | 379/265.12 |

(Continued)

OTHER PUBLICATIONS

Noble Systems Corporation, NobleWFM 2010.0.0 User Guide, Mar. 28, 2011, 324 pages, Atlanta, GA.

*Primary Examiner* — Thjuan K Addy

(57) ABSTRACT

Call center agent training is provided on a non-scheduled basis and is characterized as having a duration that is less than a scheduling interval used to schedule the agent for their work shift, as well as schedule other activities in the work shift. The delivery of snippet training content may be triggered by various conditions, including in response to: a request for training originating from the agent, a period of continuous call processing activity of the agent, various agent performance metrics, or probabilistically assigned to an agent in a group. Various parameters may selectively limit provision of a snippet training session. The agents provided with training are placed in an unavailable state prior to the snippet training session, and placed back into an available state afterwards. The snippet training content may be variously structured and can be grouped together to form an e-learning course delivered to the agent.

20 Claims, 8 Drawing Sheets

U.S. PATENT DOCUMENTS

| | | |
|---|---|---|
| 2007/0088563 A1 | 4/2007 | Nardotti, Jr. et al. |
| 2007/0111180 A1 | 5/2007 | Sperle et al. |
| 2007/0127689 A1 | 6/2007 | McIlwaine et al. |
| 2007/0195944 A1 | 8/2007 | Korenblit et al. |
| 2007/0195945 A1 | 8/2007 | Korenblit |
| 2007/0198322 A1 | 8/2007 | Bourne et al. |
| 2007/0198325 A1 | 8/2007 | Lyerly |
| 2007/0198330 A1 | 8/2007 | Korenblit et al. |
| 2010/0057493 A1 | 3/2010 | Heckelman |
| 2011/0055100 A1 | 3/2011 | Perreault et al. |
| 2011/0106566 A1 | 5/2011 | Levins |

* cited by examiner

| Time: | Monday, 3/5/2012 | | | Tuesday, 3/6/2012 | | |
|---|---|---|---|---|---|---|
| | Events | AHT | Staff | Events | AHT | Staff |
| 7:00 | 18 | 136 | 6 | 4 | 148 | 2 |
| 7:15 | 39 | 226 | 15 | 12 | 311 | 7 |
| 7:30 | 38 | 275 | 18 | 12 | 390 | 8 |
| 7:45 | 50 | 167 | 15 | 14 | 256 | 7 |
| 8:00 | 89 | 201 | 26 | 21 | 308 | 10 |
| 8:15 | 140 | 256 | 49 | 40 | 346 | 20 |
| 8:30 | 185 | 238 | 59 | 53 | 341 | 25 |
| 8:45 | 230 | 282 | 83 | 66 | 415 | 36 |
| 9:00 | 322 | 274 | 111 | 87 | 418 | 47 |
| 9:15 | 383 | 291 | 138 | 104 | 437 | 58 |
| 9:30 | 440 | 332 | 178 | 124 | 520 | 80 |
| 9:45 | 484 | 318 | 188 | 150 | 454 | 86 |
| 10:00 | 490 | 325 | 197 | 153 | 478 | 89 |
| 10:15 | 503 | 310 | 197 | 154 | 460 | 87 |

NON-SCHEDULED TRAINING FOR AN AGENT IN A CALL CENTER

BACKGROUND

A call center is typically capable of receiving and/or originating telephone calls involving staff members, variously called "telephone service representatives ("TSRs") or "agents." The agents may converse with a party who has dialed a toll free "800" customer service number to receive customer service from the call center. Or, the party may have been called by the agent for various reasons. The call center may provide a variety of services other than customer service, such as: sales promotions, debt collection, providing information, etc. Thus, the agents may have to be knowledgeable about a variety of products and procedures.

The agent's knowledge and/or competency in a given area can be referred to as a "skill" The agent's skill may be used to determine whether the agent is able to process a pending call. For example, in a financial services context, an agent having knowledge of general banking aspects may be classified as having a different skill from an agent having knowledge of mortgage programs. An agent skilled in "banking" and "mortgages" may be able to handle either type of calls, and therefore may be more useful.

Ensuring an agent is proficient in a skill may require training the agent first in the skill area and then maintaining that proficiency by subsequent periodic training. For example, an agent may have to be first trained on the basics of the financial institution's mortgage program and require periodic training about recent policy or regulatory changes, modifications to the mortgage program, or new application procedures.

Training can be provided to the agents through a variety of mechanisms based on the particular context. However, in a call center with a large number of agents with different skills, managing agent training can be a difficult administrative task. New agents may require training from the "ground up" in a number of areas, whereas other agents may require more focused training, for example, to address a particular skill deficiency. Experienced agents may desire to develop skills in new areas. Agents may also have to be regularly trained to maintain compliance with certain regulations.

It is with respect to these and other considerations that the disclosure herein is presented.

BRIEF SUMMARY

Technologies are generally presented herein pertaining to providing relatively short, non-scheduled training sessions to agents in a call center. A snippet training sessions may deliver snippet training content to an agent at various times during the agent's scheduled work shift. The conditions triggering the delivery of the snippet training session to an agent may vary, and may be limited by other aspects defined by a call center administrator. The snippet training content may have different formats. Typically, the snippet training sessions are designed to be shorter than the scheduling interval used to schedule the agent for their work shift.

In accordance with one aspect disclosed herein, a method is disclosed for storing snippet training data in a memory by a computer, the snippet training data configured to be provided to an agent's computer, wherein the snippet training data is configured to be delivered to the agent during the snippet training session having a time period that is less than a scheduling interval used to schedule the agent during the work shift. The method further comprises determining a condition triggering initiation of the snippet training session while the agent's workstation is in an available state for processing calls during the work shift and placing the agent's workstation from the available state to an unavailable state in an automatic call distributor processing calls in the call center, wherein the agent's workstation is precluded from receiving further calls from the automatic call distributor. The method further comprises delivering the snippet training data to the agent's computer by the computer during the snippet training session, wherein the snippet training session is completed in a time period less than the scheduling interval, and returning the agent's workstation back into the available state after the snippet training session has ended, wherein the agent's workstation is able to receive further calls from the automatic call distributor.

In accordance with yet another aspect disclosed herein, a system is provided that includes an automatic call distributor ("ACD") comprising a processor. The processor is configured to maintain a shift schedule for the agent, the shift schedule defined based on using a scheduling interval, process calls involving the agent during the shift schedule, and place an agent's workstation in an unavailable state in response to receiving an off-line message. The processor is further configured to place the agent's workstation in an available state in response to an on-line message. The system further comprises a training server comprising a processing device where the processing device is configured to present a first indication to an agent's computer that the agent's workstation is in the unavailable state to process calls from the ACD prior to initiation of the snippet training session to the agent. The processing device is further configured to provide the off-line message to the ACD prior to initiation of the snippet training session to the agent and provide the snippet training session to the agent's computer, wherein the snippet training session has a duration that is less than the scheduling interval used to schedule the agent. The processing device is further configured to provide the on-line message to the ACD, and present a second indication to the agent's computer that the agent's workstation is in the available state after the snippet training session has ended.

In accordance with another aspect disclosed herein, a computer program product for providing a snippet training session to an agent of a call center is provided, where the computer program product comprises a computer-readable storage medium having computer-executable instructions stored therein, the computer-executable instructions configured upon execution by a computer processor to store snippet training data in a memory of a computer comprising the computer processor, the snippet training data configured to be delivered to an agent's computer, wherein the snippet training data is configured to be presented to the agent during the snippet training session over a time period that is less than a scheduling interval used to schedule a work shift of the agent. The instructions further cause the computer processor to determine a condition triggering delivery of the snippet training session while the agent's position is in an available state for receiving calls during the work shift and transmit an indication to the automatic call distributor to place the agent's position in an unavailable state, wherein the agent's workstation is precluded from receiving subsequent calls in the automatic call distributor. The instructions further cause the computer processor to deliver the snippet training data to the agent by the computer processor during the snippet training session, wherein the snippet training session has a duration less than the scheduling interval and return the agent's position back into the available state after the snippet training session has ended, wherein the agent is able to receive calls from an automatic call distributor in the call center.

The subject matter disclosed herein may be implemented in various forms, including as, but not limited to, a computer-controlled apparatus, a computer process, a computing system, or as an article of manufacture, such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 2 shows one embodiment of a scheduling forecast using a scheduling interval.

FIGS. 3A and 3B show one embodiment of an agent schedule.

DETAILED DESCRIPTION

Figure 1:
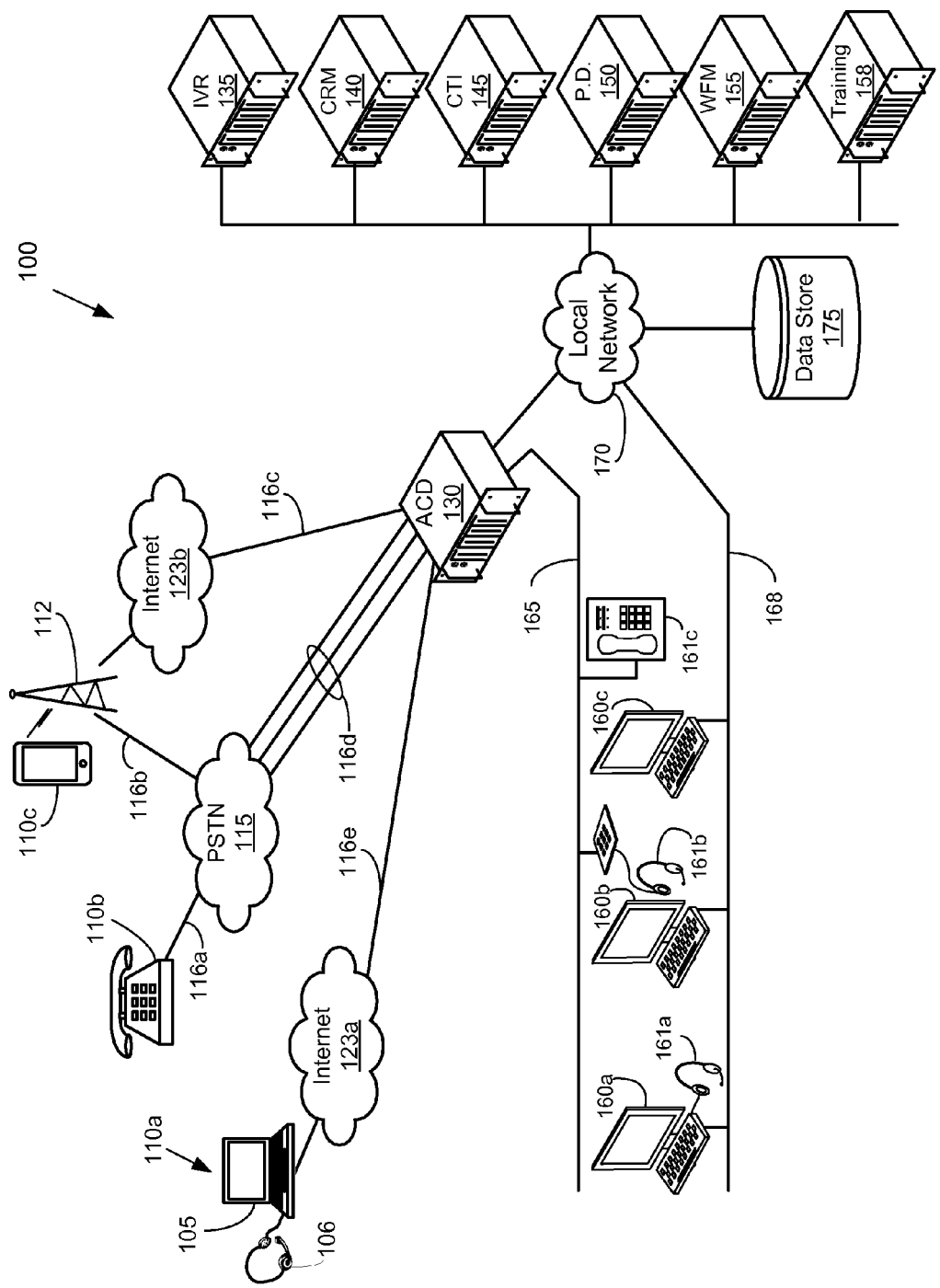
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, the call center may process other forms of communication such as facsimiles, emails, text messages, video calls, chat messages, and other forms. Since the call center may handle calls originating from a calling party, or initiated to a called party, the term "party" without any further qualification refers to a person associated with a call processed by the call center, where the call is either received from, or placed to, the party. The term "caller," if used, will generally refer to a party calling the call center, but in many cases this usage is exemplary. Thus, use of the term "caller" is not intended to limit the concepts to only inbound calls unless the context dictates such.

Inbound voice calls may originate from calling parties using a variety of phone types. A calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of a call.

Inbound voice calls may also originate from a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time division multiplexing ("TDM") technology.

Voice calls may also originate from a calling party employing a so-called "IP phone," "VoIP phone," or "soft phone" 110a. In one embodiment, this device may comprise a computing device 105, such as a laptop or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a mobile device 110c, or other device known in the art. The term "call" as used herein may mean an active instance of two-way communication, an attempt to establish two way communication, or a portion of the two-way communication depending on the context. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, e.g., text messaging, chat, video chat, facsimile, etc. Specifically, a texting messaging communication may be considered a call Inbound calls from callers to the call center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over call center facilities 165 to an available agent. The facilities 165 may be any suitable technology for conveying the call, including but not limited to a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, although separate devices may be used. In some instances, "workstation" may be used in reference to either the data or voice capability at the agent's position. For example, "routing the call to the agent's workstation" means routing a call to one of the types of voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

Agents typically log onto their workstation prior to handling calls. This allows the call center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A call center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a call center to control and/or coordinate other components of the call center architecture 100. Specifically, the CTI server may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." In one configuration, the ACD 130 and/or CTI server 145 may use the ANI of an incoming call to retrieve caller information from a data store 175 and provide the data to the agent's workstation computer 160a-160c over facilities 168 along with routing the call to the agent's workstation phone. For example, the ANI may also be used to ascertain a party's status (e.g., a "Gold Level" customer warranting premium service), to facilitate the ACD 130 routing the call to a select group of agents. The data store 175 may include one or more databases storing different information such as, for example, records of caller information. The data store 175 can be integrated with the CTI server 145, the ACD 130, or segregated as a standalone media or database. Thus, the call and associated call data are presented at the agent's headset 161b and their computer 160b.

The ACD 130 may place a call in a queue if there are no suitable agents available, or the ACD 130 may route the call to an interactive voice response server ("IVR") 135 to play voice prompts. These prompts may be in a menu type structure and the IVR 135 may collect and analyze responses from the party in the form of dual-tone multiple frequency ("DMTF") tones and/or speech. The IVR 135 may be used to further identify the purpose of the call to the CTI server 145, such as prompting the party to enter account information, or otherwise obtain information used to service the call. The IVR 135 may interact with other components, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160a-160c, as well as other components, may involve using a local area network ("LAN") 170. Other configurations are possible, such as, but not limited to, using a wide area network, wireless network, router, bridge, direct point-to-point links, etc.

When an agent is interacting with a party, the agent may use their workstation computer 160b to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, and facsimiles; the call center may also originate communications to a called party, referred to herein as "outbound" communications. In some embodiments, a call center may employ a predictive dialer ("PD") 150 to originate outbound calls on behalf of an agent at a rate designed to meet various criteria. Similar to the other components within the call center architecture 100, the PD 150 may comprise one or more software modules executing on a processing device hardware platform.

The PD 150 is typically configured to dial a list of telephone numbers to initiate outbound calls, which can be accomplished by instructing the ACD 130 to originate calls. In some embodiments, the ACD 130 may include functionality for originating calls, and if so, this component may be referred to as a private automatic branch exchange ("PBX" or "PABX"). In other embodiments (not shown), the PD 150 may directly interface with voice trunks using facilities 116*d* to the PSTN 115 for originating calls or facilities 116*c* to an Internet provider 123*b*. After the calls are originated, a transfer operation by the ACD 130 may connect the call with an agent, or place the call in a queue for an available agent. In the latter case, announcements or music may be provided to the party. In various embodiments, the PD 150 may make use of one or more algorithms to determine how and when to dial the list of numbers so as to minimize the likelihood of a called party being placed in a queue while maintaining target agent utilization.

Another server that may be employed in a call center is a workforce management ("WFM") server 155. This server maintains information to generate agent's schedules to effectively handle inbound/outbound calls. The WFM server 155 may maintain historical call volume information for call campaigns and forecast expected call volume to predict the number of agents needed to handle the call volume at a defined service level. The WFM server 155 can then apply information about available agents to generate a work roster of agents. In other words, the WFM server 155 schedules agents for their work shifts according to the anticipated needs of the call campaigns. Typically, the WFM server 155 uses a minimum time interval, referred to herein as a "scheduling interval," to generate the agent schedule. Each individual agent's work shifts are based on the scheduling interval, and the current agent's shift schedule is communicated to the ACD 130 so that is it aware of which agents are expected to log into their workstations. In various embodiments, the scheduling interval may be 15 or 30 minutes. The ACD 130 may be aware of the agent's schedule, as it expects and confirms which agents log into their workstations at certain times. The ACD also typically obtains and processes measurement data along the same intervals as the scheduling interval.

Another server may be a training server 158 configured to deliver training information to agents under various conditions. The training server may incorporate its own internal database comprising the training content, or may access an external database, such as a database residing on the data store 175. The training server 158 can communicate the training content over the local network 170 to the agent's workstation. The training content may comprise different forms, as will be discussed.

Finally, in various embodiments, the call center architecture 100 may include other servers to perform various functions. For example, an additional server (not shown) could be a quality assurance system that records communications fielded by an agent or allows a manager to monitor a voice session to ensure calls are being handled correctly.

Although the above devices are referenced as "servers," each may be also referred to as a "unit," "component," or "system." A server may incorporate a local data store or interface with an external data store. Use of the word "server" does not require the component to interact in a client-server arrangement with other components, or using a particular protocol, although that may be the case. Further, the above components may be located remotely from (or co-located with) other components. Furthermore, one or more of the functions of these components may be implemented on a single processing device to perform the functions described herein. For example, in various embodiments, one or more functionalities of the ACD 130, the IVR 135, the CRM server 140, the CTI server 145, and/or the PD 150 may be combined into a single hardware platform executing one of more software modules. In addition, the call center architecture 100 may be provided as a hosted solution, where the call processing functionality is provided as a communication service (a so-called "communication as a service" or "CaaS") to a call center operator. In other embodiments, functionality of the WFM server 155 and the training server 158 may be combined on a single hardware platform. Thus, there is no requirement that the servers identified above actually be located or controlled by a call center operator.

In addition, the agent positions can be co-located in a single physical call center or multiple physical call centers. The agents may be remotely located from the other components of the call center, and may also be remotely located from each other. This configuration is sometimes referred to as a "virtual call center." A virtual call center may describe a scenario where agents work at home, using their own computers and telephones as workstations. In some configurations, a single physical location of the call center may not be readily identifiable. This may occur when the call processing functions are provided as a service in a hosted cloud computing environment and the agents positions are located in their individual residences.

Those skilled in art will recognize FIG. 1 represents one possible configuration of a call center architecture 100, and that variations are possible with respect to the protocols, facilities, technologies, and equipment used. For example, various algorithms and queuing arrangements may be defined to efficiently process calls. In other configurations, the ACD 130 may be configured to process, not only voice calls, but also other forms of communication, and perform corresponding call processing functions for email, text, or facsimile calls. Alternatively, a web server (not shown in FIG. 1) may receive or originate email and text communications, as well as interact with other call center components.

Agent Training

To effectively service calls, agents are usually required to be trained. Agent training involves delivering learning content to the agent in a training session. The content may be of the type that provides general information about a variety of programs, products, equipment usage, procedure changes, etc. The information is provided in a training context, and the purpose is to aid the agent in handling future calls.

Training content is distinguishable from support information made available to an agent during a call which supports the agent in servicing the particular call. For example, the aforementioned CRM server 140 may be accessed during a call by an agent for accessing reference content to answer a particular question for a caller. The CRM server 140 may provide information for servicing a specific issue for a present call, as opposed to training information, which provides information in an educational or learning context and is not specific for servicing a present call. In addition, the structure of the educational or training content is different from reference content. Educational or training content often informs a user about a topic, as opposed to providing specific reference information to a user already familiar with the overall topic. Further, reference content typically does not test the reader as to comprehension, whereas educational or training content may do so.

Agent training may take various forms. One form of training may involve classroom training where agents are situated in a classroom to receive the training content. Classroom training may involve an instructor, and generally involves the agents starting at a common time during the day and for a fixed duration. Another form of training may involve coaching, where an individual mentors an agent in an individual one-on-one session. For purposes of the remainder of the discussion, the agent training disclosed herein pertains to a form of training sometimes referred to as computer-based training ("CBT"). CBT pertains to delivering training content, which can be audio only, data only, or audio/video in nature, which is provided to the agent by a computerized learning system. There are various forms, styles, and structures of CBT formats. The CBT format may be self paced and/or self guided, or may be tightly structured and serial in format. As will be seen, CBT is provided to the agents' workstations when the agents are at their position.

CBT content can also be provided in various media formats such as, for example, animated videos, narrated slides presentations, text only, and other variations. The media format may involve any number of well-known programming architectures and/or programs for providing multi-media presentations. For purposes of illustration herein, the CBT is provided to each agent on an individual basis using the agent's workstation, comprising a computer 160*b* and a headset 161*b*. Thus, the agent training involves the agent sitting at their position as opposed to physically relocating to a dedicated training room. The agent's position may be either in a physical call center co-located with other agents, or may be at their individual residence.

The training content may be downloaded to the agent workstation as an executable slide presentation, data, or script. The training content may be processed by a locally executed application program to deliver the training content. The training content may also be delivered as streaming audio/video to the agent workstation, or delivered by using a web-browser or web-based protocol (e.g., JavaScript, FLASH, or other such languages). Those skilled in the art will readily recognize a variety of techniques, protocols, standards, architectures, and/or programs that could be used to deliver the training content to the agent, and only a few of the possible approaches are identified above.

Agent Scheduling

Agents are typically scheduled to work in a call center based on a schedule to handle an expected call volume ("load"). Frequently, this is performed on a weekly basis. FIG. 2 shows one illustrative anticipated call volume in the form of a spreadsheet 200 for a call center. The spreadsheet may show the anticipated load for various times at various days of the week. This example illustrates only two days of a week, Monday 205 and Tuesday 208. Due to the volume of the data for a forecast, only a portion of the week is shown. This spreadsheet 200 is divided into intervals 209*a-c* that are 15 minutes in duration. Each interval is referred to herein as a "scheduling interval" or merely an "interval." In some embodiments, the scheduling interval may be 30 minutes, but typically it is not less than 15 minutes.

Each scheduling interval indicates the number of anticipated events (e.g., incoming calls), the average holding time ("AHT") and the required number of staff (agents) to service the calls at the specified AHT. Specifically, the row 210 at 9:30 a.m. indicates that 440 events 220 are expected, where each event can be a call. The row 210 also indicates an average holding time ("AHT") of 332 seconds 230 and that approximately 178 staff 240 are required. As can be seen from FIG. 2 overall, the number of calls increases in the morning and requires additional staff to be present. A similar forecast is shown for the following day, Tuesday 208. As evident from FIG. 2, the number of agents required to be scheduled can be relatively large, and may number into the hundreds.

The granularity of the forecast is proportional to the scheduling interval. Each interval is used to estimate the number of events based on historical data of the number of incoming calls. The required number of agents to provide the desired level of service can be calculated using well-known formulas. Decreasing the interval (e.g., to 1 minute) may allow a more accurate forecast at a given time (if data is collected and analyzed for these short intervals), but doing so comes with the expense of storing and processing the additional historical data. The same internal is typically used to schedule agents for their shift, and it would be of little benefit to forecast call volumes using one interval and then scheduling agents using another interval. Furthermore, it may not be practical to schedule agents to work within such a short scheduling interval (e.g., 1 minute intervals). Thus, there is a balance required between matching the interval used for forecasting with a practical interval used for scheduling. Going forward, it is assumed that the "interval" refers to the scheduling interval and it is the same interval used for other related activities.

Scheduling agents may involve defining a shift for each agent. This may involve setting a start time and end time, as well as defining when rest breaks and a lunch break may occur. When used without qualification, a "break" may include a rest break or lunch break. Typically, a call center administrator will define certain requirements as to when, and if, the rest break(s) and/or the lunch break can occur. For example, a lunch break may have to be roughly scheduled at the middle of an agent's shift. Some agents may be scheduled on a part-time basis with a short shift, so that there is no lunch break scheduled. Typically, if the shift is 6-8 hours, then there is a rest break before and after the lunch break.

Figures 3A, 3B:
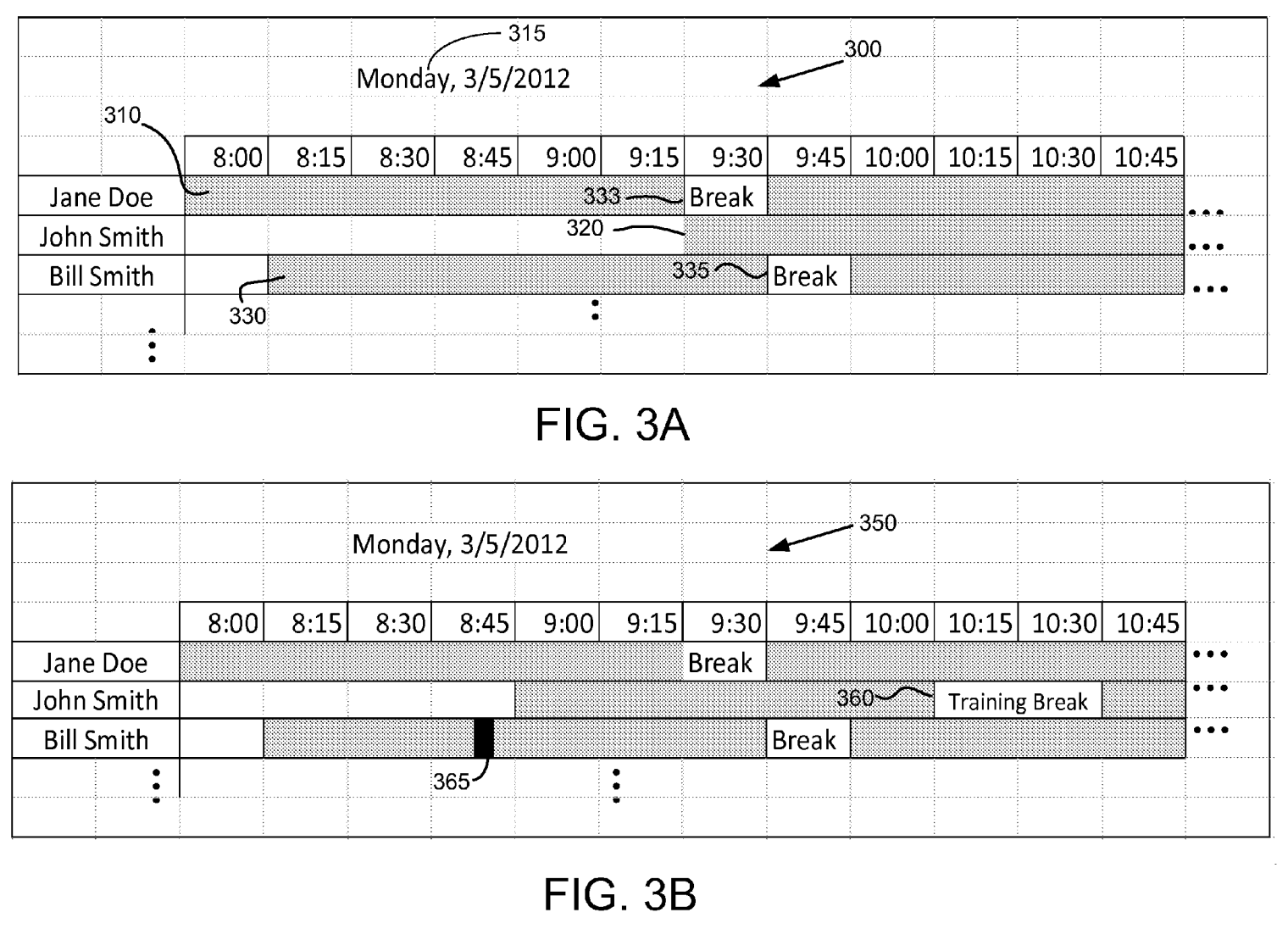

A portion of an illustrative agent schedule is shown in FIG. 3A. In FIG. 3A, the schedule 300 illustrates shifts for three agents, Jane Doe, John Smith, and Bill Jones. In a typical schedule for a call center, there may be hundreds of agents scheduled. Recall from FIG. 2 that 197 agents were required to handle the call volume at 10:00 a.m. on Monday. Thus, an actual call center shift schedule may list hundreds of agents. Because of the voluminous data, only three agents are shown, and then only for a few hours of a given day. If the scheduling intervals were smaller than the 15 minute increments shown, then additional information would be present and the schedule would be proportionately more voluminous.

The schedule 300 indicates on Monday 315, Jane Doe's shift 310 starts at 8:00 a.m. and has a first break 333 at 9:30. Jane's lunch break and second break are not illustrated due to space considerations. Similarly, John Smith's shift 320 starts at 9:30 a.m., but no mid-morning break is shown, because of the relatively later starting time. Bill Jones' shift 330 starts at 8:15 a.m. and has a mid-morning rest break 335 at 9:45 a.m. This staggered shift schedule may facilitate servicing the increasing call volume shown in FIG. 2. FIG. 3A illustrates how it may be challenging to effectively schedule hundreds of agents to meet an anticipated call volume in an efficient manner. An automated workforce management tool (e.g., provided by a WFM server 155) may be helpful to generate the work schedule.

Typically, when an agent is working (and not on a break), the agent is in an available state to process calls, which would include text message calls, facsimile calls, and other forms of communication. However, there may be reasons why an agent is considered as working, but is not available to process communication from individuals. The agent may be involved in other non-call activities, such as attending meetings, performing post-call activities, or receiving training. In some cases, the call center administrator may schedule a training session for an agent. This is illustrated in the schedule 350 in FIG. 3B in which a training break 360 is shown scheduled for John Smith. This training break 360 is shown as occurring for 30 minutes, lasting from 10:15 a.m. to 10:45 a.m. The WFM server 155 may provide a workforce management tool to schedule this training session as the training session occupies one or more scheduling intervals. Thus, the workforce management tool may be effective for scheduling a training session for an agent that is 15 minutes or 30 minutes long.

During the break, the agent is placed in an "unavailable state," which means that no further calls or other forms of communication are offered for that agent for processing. Once the break is completed, the agent is placed in an "available state," which means that calls may be offered for that agent for processing. Since the ACD 130 controls the processing of the calls for an agent, this agent's state information is usually controlled by the ACD 130. For purposes of illustration, the principles of the present invention are presented in terms of the activities of the agent as involving "calls," but encompass the agent performing non-call related activities. Thus, when the agent is in an "unavailable state," the agent would is also unavailable for processing emails from individual contacts received in the call center.

Snippet Based Training

A workforce management tool is designed to schedule agent activities with respect to the scheduling interval. If, however, the activity to be scheduled is shorter than the scheduling interval, then the workforce management tool may not be appropriate to schedule the activity. In order to effectively schedule such an activity, a reduction in scheduling interval may be required to effectively schedule the activity. In other words, if a training session is 5 minutes in duration, then the scheduling tool may require a 5 minute scheduling interval to properly schedule the training session. However, reducing the scheduling interval to 5 minutes may increase the amount of data needed to be processed by the call center overall. This may necessitate obtaining data at more frequent intervals to properly forecast the activity and may require additional processing to schedule agents at the shorter scheduling interval and additional hardware to store the data. To recap using the above example and FIG. 3B, if Bill Jones is to have a 5 minute training session 365 scheduled at 8:37 a.m., then the workforce management tool may not be suitable for scheduling this activity, since the activity would occur in the middle of a scheduling interval. To summarize, if the training session occupies the entire scheduling interval (e.g., 15 minutes), then the workforce management tool may be used for scheduling the training break. If the training session is less than the scheduling interval, then the workforce scheduling tool may be unsuitable, unless modifications are made to reduce the duration of the scheduling interval.

In some instances, the training needs of an agent may not be completely known in advance of creating the agent's work schedule. Typically, work schedules are created a week or so in advance, and inserting a scheduled event into a schedule afterwards would require re-executing the scheduling program. This can take time and create inefficiencies, especially as the scheduling interval decreases in time.

Furthermore, in particular instances, as the training session duration decreases, it is less important that the session occur at the scheduled time. In other words, if the training session occupies one or more scheduling intervals, it is more likely important that the activity occur when scheduled. This ensures that service levels are not adversely impacted by one or more agents interacting in training. On the other hand, if the training session is very short relative to the scheduling interval, then the training session is less likely to adversely impact service levels. In fact, in many instances, a single short training session can likely occur at any time during an agent's shift without materially adversely impacting service levels of the call center.

Consider an example of scheduling two activities that are shorter than the scheduling interval. Specifically, two short training sessions that are 5 minutes each (a total of 10 minutes) are to be scheduled for an agent. Assume that one training session may occur in the morning and the other in the afternoon. One approach is to allocate each training session to a scheduling interval (e.g., 15 minutes)—one in the morning and another in the afternoon. However, doing so will make it appear as though the agent is scheduled for 30 minutes of training, when in reality, only 10 minutes are required. This provides a misleading portrayal of the agent's schedule. As this error may occur for each agent, an inaccurate call center work schedule may be produced to meet the anticipated load by using the scheduling intervals.

In reality, these two 5 minute training sessions take less time to complete than dedicating a single 15 minute training session. As the training session decreases relative to the scheduling interval, there is a decrease in the impact to the grade of service provided overall by the call center as a result of the training session. In other words, in light of the forecast of FIG. 2, providing a 5 minute training break for an agent is not likely to significantly adversely impact the grade of service. In fact, it would be possible to merely allow the training session to occur whenever it is convenient for the agent, or based on some other criteria. Stated another way, it is not necessary for the workforce management server to schedule this short training break for the agent using the same techniques for scheduling other types of breaks.

Thus, processing activities that are shorter than the scheduling interval can be processed differently from activities that are the same or longer than the scheduling interval. For reference purposes, a training session that is shorter than the scheduling interval is referenced herein as a "snippet training session" ("STS"). A training session that is as long or longer than the scheduling interval (and that maybe scheduled in a conventional manner using the scheduling tool offered by a WFM server 155) is referred to herein as a "scheduling interval training session" or a "conventional training session." Without any further qualification, a "training session" used henceforth without further limitation refers to a snippet training session.

The educational content designed to be delivered in a time period that is shorter than the scheduling interval is termed "snippet training content" or "snippet training data." Similarly, the activity of delivering snippet training content may be referred to at a general level as "snippet training." A particular instance of delivery snippet training content may also be referred to as a "snippet training session." The STS involves various processing associated with preparing the agent for information delivery, and can be thought of as including various housekeeping details necessary to prepare for the delivery of the snippet training content.

A snippet training session is designed to be completed in a time frame that is shorter than the scheduling interval. The snippet training content may be, for example, in a multimedia format that starts and completes within an anticipated time period. The snippet training content may be provided in a self-paced format, but is designed to be completed by an agent within a time period that is less than the scheduling interval, e.g., 5 minutes in light of the prior example of a 15 minute scheduling interval. In such cases, the playback of the snippet training content is fixed by the player processing the snippet training data.

For example, if the snippet training data is multi-media comprising a MP3 based file, then the expected duration would be governed by the time it would take to playback the file. Some presentations may be "self-paced" and allow the user to control certain timing aspects, for example when to advance to a new slide, but typically the time period of the overall presentation still has an expected duration for the average user. The snippet training data may comprise any number of well known data and/or presentation forms, including: an audio stream in a Real Media, QuickTime, Midi, or other format; a video stream in MPEG, FLASH, AVI file format or other format; or a visual-only format such as JPEG, PNG, TIFF, PNG, WEBP, etc. Other possibilities will come to mind to those skilled in the art.

A snippet training content may incorporate questions, which the user may require time to ponder. In particular embodiments, a timer may be used by a training program module to ensure that the agent completes a response within a target time period. For example, using the illustrative scheduling interval of 15 minutes, training content comprising a brief paragraph followed by a multiple choice question would be considered snippet training content if the content was intended to be completed within a target time frame that is less than the scheduling interval. In other words, merely because a particular agent may take 25 minutes to read a brief paragraph and an additional 25 minutes to answer the multiple choice question, this would not result in that training content to be considered as a scheduling interval training session. If the training content was designed to be completed by the average agent in a time period, e.g., 5-8 minutes, which is less than the 15 minutes scheduling interval, the training content would be considered snippet training content or a "snippet."

Not all training may be suitable for delivery as a snippet training session. The content of certain training sessions may require at least one or more scheduling intervals (e.g., 15-30 minutes) to effectively educate the agent. In this case, it may be more suitable to schedule a conventional training session. However, other forms of training may be effectively delivered in 5-10 minutes, which is less than a common scheduling interval. Specifically, some forms of training may focus on a single concept, or narrow the information provided, thus allowing for training to be provided during a snippet training session. Furthermore, in other embodiments, the call center may implement a scheduling interval of 30 minutes. This would allow, e.g., a 15-20 minute training session to be considered as a snippet training session.

As between a 1) snippet training session and a 2) scheduling interval training session, the latter is more likely to encounter a change in call volume in the call center during the interval. In other words, the longer the training session, the more likely it will cover a time period when the number of required staff changes. A snippet training session, because it is shorter in duration, is less likely to cover a time period when staffing needs increase.

Because of the length of the scheduling interval training session, it may be necessary for the training system to interrupt or terminate a scheduling interval training session when call volumes increase beyond a certain level. Doing so creates inefficiencies, since it is time consuming and repetitive for the agent to subsequently restart training on the same training content. This can result in the time allocated to training the agent to almost double in time. In fact, if there is an interruption on the second attempt, the time allocated to training may more than double. Replication can be minimized in a scheduling interval training session if the agent resumes at the point of interruption. However, this requires mechanisms for tracking and bookmarking the position of that particular training session for that agent. Furthermore, the effectiveness of the training for the agent may be reduced if the time between the first interrupted session and the second resumed session is lengthy.

However, because a snippet training session is shorter than the scheduling interval, the call center may let a snippet training session complete despite an increase in call volume, as opposed to interrupting the training session for that agent. The reasoning is, in part, that any degradation in service level is very short and may be further compensated by delaying other snippet training sessions. Thus, it may be overall more efficient to provide the snippet training session in an uninterrupted manner or in a flexible time manner, as opposed to implementing scheduling interval training sessions with the infrastructure for bookmarking each agents position in the training and having to reschedule the same training for the same agent.

Consider, for example, a large call center with 100+ agents. Every time a scheduling interval training session is interrupted for an agent and has to rescheduled, the shift schedule for the entire call center would have to be rerun to generate an updated schedule. Because the snippet training session is shorter than a scheduling interval, snippet training sessions can be provided in a non-scheduled manner for an agent.

A "scheduled" training session (such as the schedule interval training session) is a training session that is associated with an agent and occurs at a future time period as indicated in the call center work schedule. Thus, a "non-scheduled" training session is one that is not shown on the agent's shift schedule. In many instances, the shift schedule is provided to an agent a week in advance. In some embodiments, the agent's shift schedule, or the overall shift schedule, may indicate which agents are eligible for training, but no specific time is indicated (because the training time is not known at that time).

Triggering Snippet Training Sessions

Because snippet training sessions are not scheduled, a training session may be initiated to the agent under various conditions. When the conditions allow initiation of the training session, this is referred to as "triggering" the snippet training session. Triggering a STS (or merely "triggering a snippet") can occur in a variety of ways. After the STS is triggered, the snippet training content is usually delivered. The following description is not intended to be exhaustive as to the ways a snippet training session can be triggered, as those skilled in the art will be able to develop additional mechanisms for triggering a snippet training session.

i) Demand Based Triggering

In one embodiment, the trigger is based on an agent request. This may be referred to as an "on-demand" or "explicit" trigger. The agent may initiate, on their own initiative, a request for a STS. The agent may request an STS for a specific topic or a generic request for training in general. The provision of an on-demand STS may be viewed as a way for the agent to change their work flow to alleviate boredom or otherwise alter their work pace. The agent may be informed or prompted by the training server 158 to initiate a STS, and the agent may provide a confirmation to proceed (e.g., the training server may prompt the user "Time for a training break—do you want to continue?"). Specifically, the training server 158 may transmit a message to the agent, either by sending an email, whisper, communicating via an open browser window, desktop application, message board, or other form, indicating that the agent is eligible to request a STS. If the agent denies or rejects the opportunity for the STS, this does not preclude the agent from being prompted again, or requesting an STS again at a later time. The same snippet training content may be provided in a subsequent STS.

Once a request is received from the agent, the training server 158 may check various parameters that may limit the provision of the STS. The STS for an on-demand trigger may be limited by:

- a count of the cumulative durations of STS provided in a time period per shift, day, week, or other time period per agent (e.g., no more than 15 cumulative minutes of STS per any given shift),
- a maximum number of sessions provided to an agent per day, shift, or week (e.g., an agent may invoke up to 15 STS per week),
- a maximum number of STS or STS minutes may be limited to a group of agents, where the group is defined for a shift, day, week, or other time period (e.g., no more than ten STS may occur during a single day for all agents combined), or
- a maximum metric associated with an agent, shift, call center, or agent team, such as a call volume, queue waiting time, etc.

Those skilled in art will recognize that other limiting approaches to an on-demand trigger can be developed to limit the provision based on aggregate call volume, trending call volume, agent utilization, etc.

If the snippet training session is allowed to be provided, the system updates the appropriate parameters used to limit the STS (such as counters reflecting delivery of the content), and provides the training session to the agent's workstation. In some embodiments, the parameters may be updated only after the training session is provided and completed.

On-demand triggering is usually accomplished by the agent invoking a graphical user interface control at their computer 160, which transmits a message directly or indirectly to the training server 158 conveying the request. The training server 158 may respond to the agent's computer 160 and indicate whether the training session will or will not be provided. As will be seen, other actions may be associated with providing the STS to an agent.

ii) System Initiated—Based on Cumulative Agent Work Time

The STS may be triggered by the training server 158 or other component based on monitoring an agent's work duration in that agent's shift. This arrangement provides the agent with a periodic respite from call answering activities, but ensures the agent is still engaged in a productive activity. In one embodiment, the cumulative agent work time is measured. This could be defined as measuring the uninterrupted agent work time since their last break or since the beginning of their shift. In other words, if the agent has worked continuously for a certain time period (e.g., 1.5 hours), then the agent may be eligible for a STS. In one embodiment, the training server 158 informs the agent after the cumulative time period has occurred, and provides the STS to the agent. In another embodiment, the training server 158 may prompt the agent to initiate an on-demand STS after the cumulative time period.

The cumulative work time may be maintained by the ACD 130, CTI server 145, or other component. The cumulative work time may indicate how long the agent has been working into their shift from the beginning of the shift, or from some other starting point within that shift. This information may be transmitted to, or polled by, the training server 158 to determine that the agent worked the necessary cumulative work time to be eligible for an STS.

iii) System Initiated—Based on Agent Productivity

The training server 158 can also offer a STS to an agent based on monitoring and/or analyzing various agent-specific agent performance metrics. This may include an indicator related to agent productivity, such as, but not limited to:

- call handling disposition metrics (e.g., number of sales calls closed, caller issues resolved, service calls resolved, etc.),
- average call handling time by the agent,
- agent utilization rates, or
- number of calls handled per time period.

Triggering an STS can be used to provide training to an agent that may be deficient in a particular metric or may be provided if the agent exceeds the metric. The STS may be selected to address a particular skill in which the agent may require further training. Alternatively, the triggering of the STS may be to provide to efficient agents to allow them to train in another area, or a change in the work flow.

The call center agent performance parameter may be maintained by the ACD 130, CTI server 145, or other component. Typically, the parameter is based on a metric maintained from the beginning of the agent's scheduled shift. This information may be transmitted to, monitored, or polled by, the training server 158 to determine that the agent has been working for the necessary cumulative work time.

iv) Probabilistic Triggering

The initiation of a STS for an agent may be based on an agent associated with a group of agents, such as a team (e.g., a collection comprising a subset of current agents) or a call center (e.g., an entire group of all currently working agents). The STS is allocated to an agent taking into account a probability distribution function, such as a Gaussian distribution, random distribution, or some other algorithm or function. Each agent in the group is eligible to receive an STS according to a probability defined by a distribution function. Thus, in a random distribution function, a STS may be randomly assigned to an agent in the group, such as agents on a particular team of agents. In other words, the identification of the agent associated with the STS may be determined just prior to the STS being initiated. Allocation of the STS to each agent is identified in a probabilistic manner.

The STS allocated may be limited by frequency and number. The training server 158 may be further configured to enable/disable the probabilistic distribution of a STS to a particular agent in a group, or to the entire agent group based on certain measurements or parameter settings. For example, enablement may occur when call volume or other traffic related metrics reach a threshold and/or a parameter setting allows such distribution to occur. More specifically, when the call volume or average holding time drops to a certain level (either for the particular agent or the group of agents, indicating that some agents are not required for handling incoming calls), then the probabilistic distribution of STS may be enabled. This ensures that provision of an STS only occurs when there is a relatively low call volume, and ensures that the STS does not degrade service levels during peak times when every agents is needed.

In this embodiment, the training server 158 may determine certain metrics maintained by the ACD 130 or the CTI server 145 which may be necessary for the triggering to occur. For example, the training server 158 may query or poll the ACD 130 or CTI server 145 for the current call volume level, and if below a threshold, allow the triggering to occur.

Overview of Providing a STS to an Agent

Figure 4:
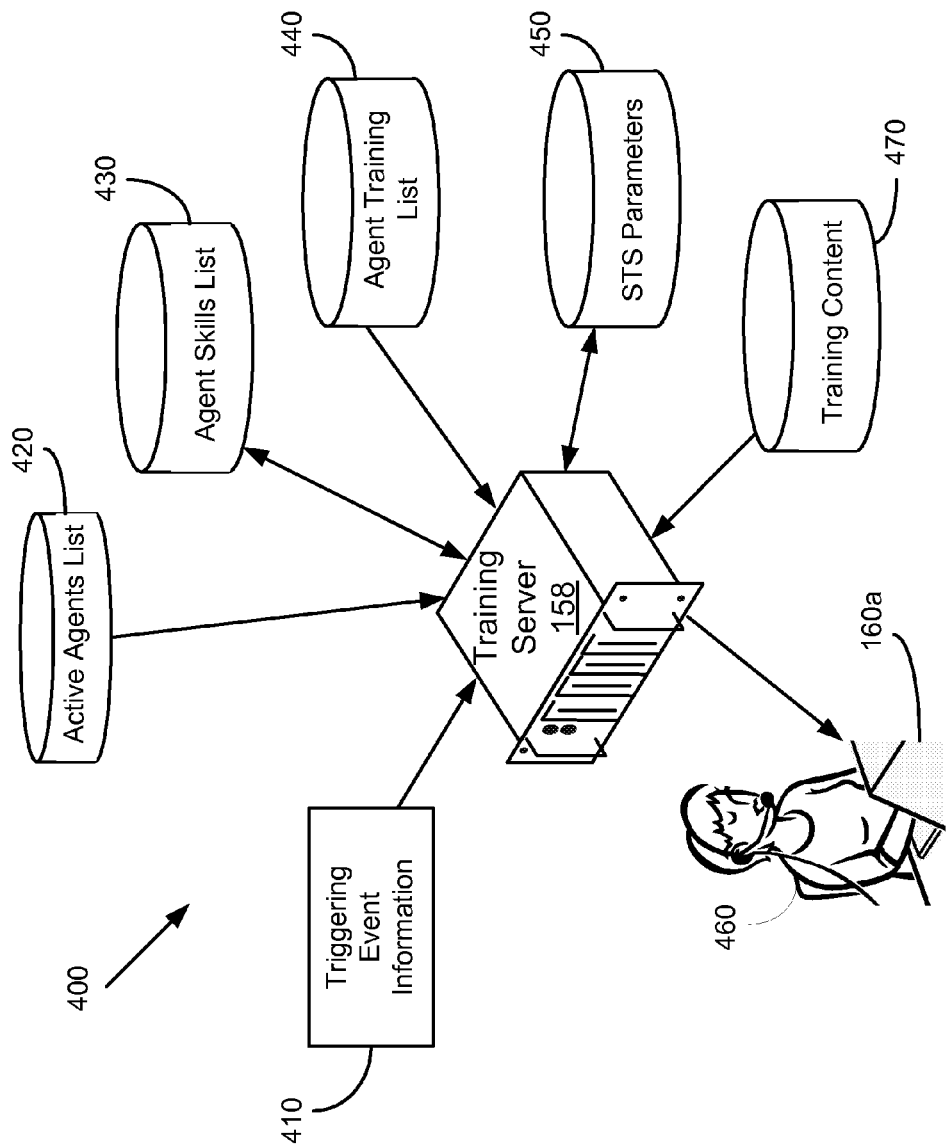
FIG. 4 illustrates a training server and various types of data used by the training server to deliver a snippet training session to an agent according to one embodiment disclosed herein.

In particular embodiments, providing a STS to an agent in a call center requires access to various data sources. These are schematically illustrated in FIG. 4. The training server 158 delivers the training content to the agent 460 via the agent's workstation, which may include a computer 160a and a headset 161a. To accomplish delivery of the STS in these embodiments, the training server 158 requires information from various data sources which are schematically depicted as databases in FIG. 4. It should be noted that the data sources do not necessarily need to be databases. For instance, in other embodiments, the data sources may, instead, be flat files designed to hold data. Other formats and storage access arrangements are readily possible. However, for the sake of this disclosure, the data sources are databases. These databases include, but are not limited to: the active agents list database 420, the agent skills list database 430, the agent training list database 440, and the STS parameters database 450. Each database may be implemented on a standalone medium or may be incorporated in one of the servers identified in FIG. 1, such as the workforce management server 155 or the training server 158. In other embodiments, different combinations of equipment may be used. Thus, FIG. 4 is not intended to limit the potential deployment configurations.

The agent training list 440 represents information, typically stored as records, of the agents that are to receive training. This list may be determined by the call center administrator or other automated systems that identify the universe of agents to receive snippet based training. In one embodiment, the agent training list 440 may simply be the list of all agents that are employed at a call center. If all agents, for example, are required to receive annual learning on a topic, then identification of the agents is relatively straightforward and would comprise all the agents. However, in other instances, a subset of the agents is to be trained, which can be based on various criteria. The training server 158 receives the agent training list 440. For instance, this data may be provided to the training server from data stored in the workforce management server 155 and derived therefrom.

In addition to identifying the agents to be trained, it may be necessary for the training server 158 to identify the subject matter the agents are to be trained in. This may involve analyzing the agent skills list 430 indicating what skills each agent has (and therefore identifying which skills the agent is deficient). Furthermore, an agent may have a rating in addition to a skill, and so training may be provided to increase the agent's rating within the skill. The training server 158 may use the agent skills list 430 to determine which agents should receive additional training, or already have been trained. Furthermore, training server 158 may update the agent skills list 430 after an agent has been trained to reflect that the agent has been trained. It is possible that the information regarding the agents to be trained in the agent training list 440 and the agent skills list 430 may be stored in a relational database. Thus, in particular instances, it is not necessary to have two separate databases with separate data. For example, in one embodiment, the agent skills list may be stored in the workforce management server 155 as well and provided to the training server 158.

The active agents list 420 indicates which agents are active at any given time. Active in this context means logged into a workstation for a shift and potentially available to process calls. A call center may be staffed 24 hours per day and may have several shifts of agents. Thus, at any given time, only a subset of the agents employed may be scheduled to work. Consequently, in order to deliver training to an agent, it is not sufficient to know that all agents need to be trained, but the training server 158 needs to further know which agents are currently present to receive training. An agent may be scheduled, but may be sick (or tardy). It is possible to determine which of the scheduled agents are actually present by ascertaining which agents are logged into their workstations. The active agents list may be stored in the ACD 130, the workforce management server 155, another component shown in FIG. 1, or another component not shown in FIG. 1.

The above databases provide information to the training server 158 used to determine who is to be trained. In order to determine when the STS is to be provided to the agents, the training server 158 may require triggering event information 410. The triggering event information 410 may be provided by the ACD 130 or other component that provides various event information and metrics, including those discussed above with respect to triggering an STS. Specifically, the triggering event information 410 could comprise an agent's request for an on-demand STS, a call volume level reported to the training server 158 from the ACD 130, an agent utilization summary, an agent duration work time, etc. This information may be used by the training server 158 to initiate the STS.

The STS parameters 450 define various aspects of how the STS presentation is provided to the agent. Recall that the STS can be provided to an agent upon request ("on-demand") and the delivery can be limited in various ways. The STS parameters 450 may store counters and other values which are used to determine how many on-demand requests for a given agent can be processed during a time period, or how many requests for a given shift overall can be processed.

On the other hand, if the STS is provided in response to a performance metric (e.g., cumulative active agent work time), the STS may be associated with this defined parameters, and may monitor or maintain a real-time table of performance metric values for currently active agents. Thus, the training server 158 may update the STS parameters with real-time values obtain from other sources. The training server 158 may periodically scan the table to identify which agents are eligible. Furthermore, the training server 158 may only allow an STS to be triggered if the call volume for an agent, queue, team of agents, shift of agents, call center, etc. is below a threshold. This threshold value may be also defined by the STS parameters 450.

In another embodiment, if a STS is allocated to a group of agents, such as a queue, team, shift, or call center, the algorithm for allocation the STS may be defined in the STS parameters database 450 based on this agent grouping. The algorithm could be, e.g., based on a random allocation of agents from the group, a round robin allocation scheme, a first-in first-out queue, work duration based on agent login times, etc. The frequency of allocation could be determined using a distribution algorithm, or other scheme.

Once the training server 158 determines a STS is to be provided to a particular agent, the training server may access the training content from the training content database 470. The training content can take various forms, including text, audio, or multi-media. The training content is designed to be completed in a duration that is typically shorter than the scheduling interval. In various embodiments, the training content can be cached in the training server or downloaded in advance to the agent's computer workstation 160a.

Flowchart for Providing a STS to an Agent

Figure 5:
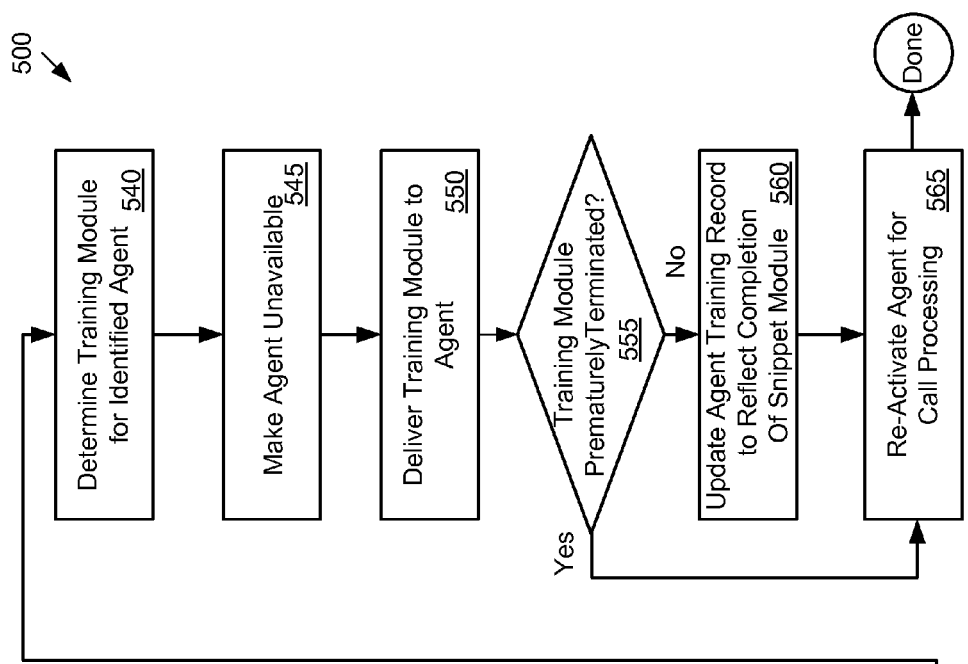
FIG. 5 illustrates a process flow for delivery of a snippet training session to an agent according to one embodiment disclosed herein.
Figure 5:
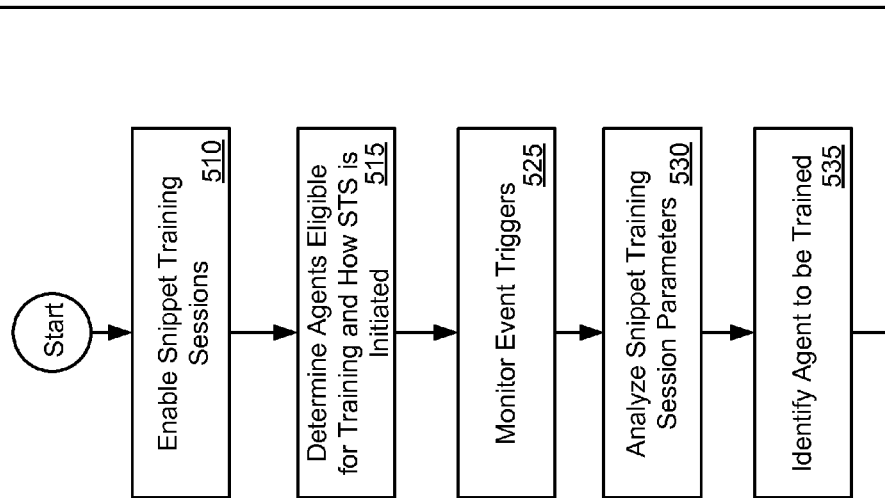

Turning now to FIG. 5, additional details will be provided regarding the process flow for delivering a STS to an agent.

The logical operations described herein may be implemented (1) as a sequence of computer implemented operations and/or as one or more program modules, including a snippet training program module running on a computing system, such as a server, and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. Greater or fewer operations may be performed than shown in the figures and described herein. These operations may also be performed in a different order than those described herein.

The process of providing a STS to an agent is described using one of the various methods for triggering an STS for an agent. Consequently, several of the operations discussed in the illustrative embodiment are not relevant for other embodiments, and other operations associated with other embodiments are not shown.

Starting with operation 510, a determination is first made that a STS may be provided. A system wide configurable parameter may be set by the call center administrator to prohibit any STS from being initiated. Alternatively, the parameter could be set for a particular day. For example, Mondays are typically very busy for call centers, and the training server 158 may be configured to preclude initiation of a STS. In another embodiment, a configurable parameter may generally preclude STS initiation when call volumes at the ACD 130 exceed a threshold level. This operation is optional, and may not be present in each implementation.

In operation 515, the training server 158 determines which agents are eligible for training, and if so, how the STS is to be initiated. This operation involves processing the agent training list, to determine what training content is to be delivered, and how the STS is provided. In this illustration, it is presumed that all agents in a particular group are to be trained in a general skills topic.

How the STS is to be provided refers to how triggering of the STS is initiated. For purposes of illustration and not limitation, it is assumed that the disposition of each call from an agent is reviewed to determine whether a STS is to be initiated. The triggering algorithm could be, for example, providing an STS to an agent after each $10^{th}$ call handled by the agent with a certain call handling disposition code. The disposition code may be a value allocated by the agent after a call to indicate, e.g., that the issue was successfully resolved, or that a sale to the customer occurred.

It should be appreciated that numerous variations are possible. It is possible that the triggering could be based on, e.g., monitoring an average call holding time of an agent. If this parameter varies by a certain amount from an average call holding time for all agents in the call center, then a training session is initiated for that agent. Other parameters could be used. In another approach, a probabilistic distribution function is used to determine when a STS is to be provided to a randomly selected agent according to a frequency distribution.

Once it is known how the triggering will occur, then in operation 525 the training server 158 monitors the appropriate conditions to determine if a suitable event triggering the STS has been met. Returning to the embodiment described above, the training server 158 may receive an indication as to the disposition code for each call by an agent. This may be accomplished by reporting a call disposition code from the ACD 130 or CTI server 145 to the training server 158. The training server 158 could accumulate these event triggers in operation 525 and then analyze the collected events against the STS parameters in operation 530. It is possible that different STS parameters could be defined for each agent. Specifically, one agent may have a STS initiated after 10 disposition codes of a certain type, whereas another may have the STS initiated after 20 disposition codes of a certain type. Further, the STS parameters may include other parameters which limit, restrict, or must be met to initiate the STS, which can be referred to as negative limitations. For example, the STS parameters may require that for the agent to receive the STS, the average call holding time or call center call volume must be below a threshold, or that another agent must be available to handle a call. In other triggering schemes, other variables may be collected and analyzed and used as negative limitations preventing initiation of the STS.

In operation 535, the particular agent for which the triggering criterion is met is identified. This may be accomplished by scanning a table of agent related data and comparing each with a STS parameter. In some embodiments, such as using a probability function, the agent may be selected at random from a group, or based on the time when an agent last received an STS.

The sequence and nature of operations 510-535 varies based on the particular mechanism used to trigger the STS. For example, if the basis for triggering an STS is an on-demand request from an agent, operation 535 may not be required, since the agent self-identifies themselves when making the request. However, in this case, STS parameters limiting the number of STS for that agent may be consulted to determine whether to fulfill the request. In another example, if the mechanism triggering the STS is based on a probability distribution, then an agent would be selected in operation 535. The frequency of the STS in this case may be based on a timer (which is effectively becomes the event trigger), which means that there may not be other forms of the event trigger in operation 525 that are monitored.

It is possible that multiple distinct triggering mechanisms may be simultaneously active in a call center. One set of agents may be provided with STS on a demand basis, while another set of agents may be provided with STS based on a distribution function. An agent could even be a member of both groups.

Once the agent to receive training is determined in operation 535, then the appropriate training module for the agent in operation 540 is determined. The content of the training that an agent may receive may vary. The training could be individual to the agent, or may be general in nature. For example, an agent may receive subject matter specific training to achieve a particular skill. On the other hand, there may be only one training module which all agents are to receive. The nature of the snippet training content that are delivered and their content are discussed later.

In operation 545, the agent may be made unavailable, which means the agent's position may be suspended from call processing activities before they are provided the STS. More specifically, this refers to the agent's computer and/or phone device at the agent's position being unavailable from call processing activities. This may occur by the training server 158 transmitting an "agent-in-training" indicator to the ACD to make the agent unavailable. This can be accomplished by, for example, sending a message to the ACD to place the agent in an "off-line" state. This suspension can be also referred to as making the "agent's position unavailable," "placing the agent's workstation off-line," making the "agent unavailable," or variations thereof. The ACD may then cease to offer calls to the agent. Because the handling of calls requires coordination of speech and data, this phraseology is understood by those skilled in the art to imply a coordination of both voice and data as appropriate for the call center architecture. Other command names may be used to place the agent in an unavailable state from processing subsequent calls from the ACD. A corresponding command may be used to make the agent available, or place the agent "on-line" (with the result also being known as "making the agent available" or similar phrases). As evident, the condition triggering the STS may be determined while the agent is available for processing calls. Making the agent unavailable allows the agent's attention to be focused on the STS, and allows the STS to proceed in an uninterruptable manner.

In some embodiments, the STS is uninterruptible by call processing activities that may be otherwise associated with the agent, by a call center component, or other activities. Thus, even if a call would be normally directed to that particular agent, the ACD does not offer the call. If the call volume of the call center increases and peaks, the training server may in turn limit the provision of a STS to another agent until the peak subsides.

However, in other embodiments, the call processing activities for the agent may continue as normal during an STS, and the delivery of a call to the agent may result in: a) continuing the STS as normal, b) suspending the STS in mid-session, or c) terminating the STS.

In option a), if the STS continues as normal, the agent may ignore the call, or process the call while engaged in the STS. In this case, the agent may not be able to effectively handle both activities (call servicing and training), and so this option may be precluded by the training server.

In option b), if the STS is suspended in mid-session, then any timers associated with the training session are also suspended, and the training resumes upon ending of the call processed by the agent. This may occur based on the agent voluntarily interrupting the STS, which can occur for various reasons. The training server 158 may also allow the agent to voluntarily resume the STS. In other embodiments, another component may interrupt and resume the STS on behalf of the agent. In other embodiments, the ACD 130 or CTI Server 145 may be precluded from interrupting the STS.

In option c), the STS is prematurely terminated (e.g., not completed) and the agent is placed back into an available state. The same training content may be offered up to the agent in a future STS. Once the agent is repositioned back an unavailable state, then the snippet training content can be delivered in operation 550 to the agent from, but from the beginning.

Terminating a snippet training session before it completes prevents the complete delivery of the training content. This can occur because the agent terminated the STS on their own command. This could be done in response to the general operating conditions of the call center, or to handle a particular call. Terminating the STS prior to completion is different from interrupting the STS. When the STS is terminated, the STS cannot be restarted at that point. However, the same training content may be delivered in a subsequent STS to the same agent. In contrast, when the STS is interrupted, it can be restarted later at the same point.

Thus, if the STS is terminated in operation 555, the agent is made available or re-activated (placed in an available state for processing calls) in operation 565. The snippet module is not recorded as having been provided. Reactivating the agent may occur by the training server 158 transmitting a command to the ACD 130 or the CTI server 145 indicating that the agent's training is completed, and that the agent should be returned to the available state, e.g., available to process calls from the ACD 130. Alternatively, assuming that the training module is completed in operation 555, appropriate records are updated in operation 560 to reflect that the agent has received training. The process completes with re-activating the agents for call processing in operation 565.

Those skilled in the art will recognize that variations on the operations shown in FIG. 5 are possible, and that it is not possible to illustrate all the potential variations for processing a STS for an agent in FIG. 5.

Snippet Formats

The term "snippet" used herein may refer to learning related content (e.g., a data structure) or a training session (activity) that can be presented to the agent in a time window that is designed to be shorter than the scheduling interval. The distinction between a session and the content is usually evident from the context in which the term is used. In both cases, the training data can be presented in a training session that is shorter than the scheduling interval.

Figure 6:
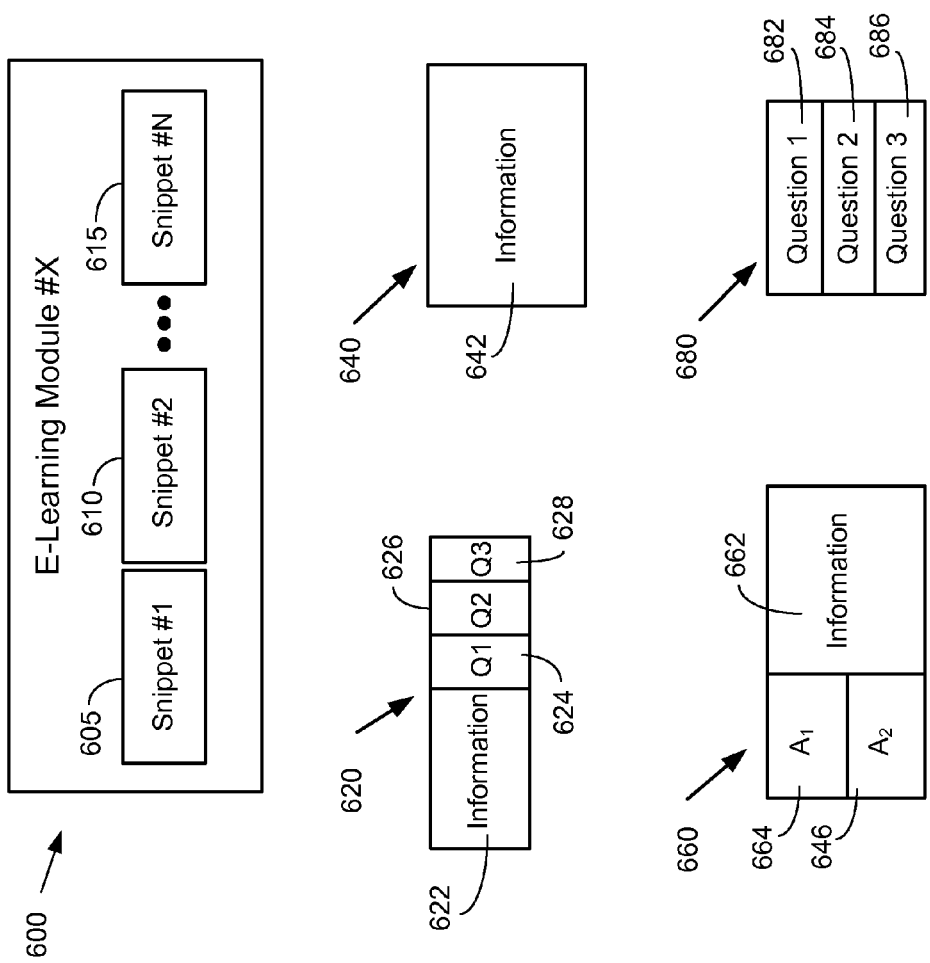
FIG. 6 illustrates various formats of snippet training data that may be delivered to the agent according to one embodiment disclosed herein.

FIG. 6 illustrates snippet training content represented as snippet data having various snippet structures or formats, and their relationship with an e-learning module. Turning to FIG. 6, the e-learning module 600 represents an e-learning content that educates an agent on a particular subject. An e-learning module 600 may comprise a linear arrangement of snippets (i.e., a data structure) 605, 610, and 615 delivered to the agent's workstation serially over time. These snippets may also be referred to as "snippet modules." A given snippet may be delivered in an uninterruptable manner, but often there is a time period between deliveries of different snippets in a module (e.g., between snippet 605 and snippet 610). These time periods are usually characterized by the agent handling calls, ending a shift, break, or engaged in some other non-learning activity. In other embodiments, an e-learning module 600 may comprise a number of snippet modules that are delivered in random order. An e-learning module may have, for example, only one, a few, or a dozen snippet modules.

Various snippet module formats are identified. An e-learning module 600 may comprise a single snippet module format, or a mixture of snippet module formats. Different formats may be preferred for different applications as will be seen. The first format shows a conventional snippet module format 620 that comprises an information portion 622 followed by a testing portion 624-628. The testing portion may comprise three questions 624, 626, and 628. These questions may be delivered in sequence or in random order for testing the agent. The information portion 622 may be delivered in various forms, including: audio, video, text, or multi-media. The information portion 622 is designed to convey the educational information, and the testing portion 624-628 is designed to test the agent as to the information presented. A score may be associated with the snippet module, and may comprise a "passing grade." Thus, delivering the snippet provides information to the agent, and the agent is then tested to review comprehension of the main points.

Another snippet module format is an informational snippet module format 640 ("informational format" or "informational snippet"). The informational format only comprises an information portion 642 and may be useful in providing general information to the agent. For instance, it may be useful in conveying changes to operational policy of the call center, business procedures, etc. No testing portion is explicitly included in the informational snippet module format 640, but it is possible that after a series of informational snippets, a testing snippet module 680 is presented to the agent. The testing snippet module 680 comprises only questions 682-686 or other mechanisms to test the agent's comprehension. Thus, after sufficient information is provided through a series of informational snippets 640, it is possible to test the agent's comprehension with one or more testing snippet modules 680.

Another snippet module format is the so-called trivia snippet module format 660. The trivia snippet follows a format where a question is presented with multiple choices. In this example, two answers $A_1$ 664 and $A_2$ 646 are presented to the agent. Assuming, e.g., that the agents are handling sales calls for XYZ Appliance Company, the question may be: "Does the XYZ Appliance Company sell extended warranties?" A question can be presented in a "true/false" format, and upon selecting the answer, further information may be provided. For example, if the agent selected "yes", the answer in the information portion 662 may indicate "Yes, the XYZ Appliance Company offers an extended warranty up to five years on every appliance it offers." The information portion 662 identifies the correct answer and is designed to provide additional information to the agent as part of the process. Thus, the trivia snippet module format 660 provides information beyond the mere identification of the correct answer in order to educate the agent.

As can be envisioned, an e-learning module may comprise various types of snippet modules each having different formats. For instance, an e-learning module could provide snippets having trivia snippet module formats 660 in a random order to provide general information to the agents on a variety of topics. An e-learning module could comprise a set of randomly selected snippets having a conventional snippet module format 620 to provide product overview information. Another e-learning module may provide a series of snippets having an informational snippet module format 640 that is then followed by a snippet having a testing snippet module format 680 covering the same subject matter. The e-learning modules could inform, educate, and access agent comprehension and knowledge on a variety of topics.

Figure 7:
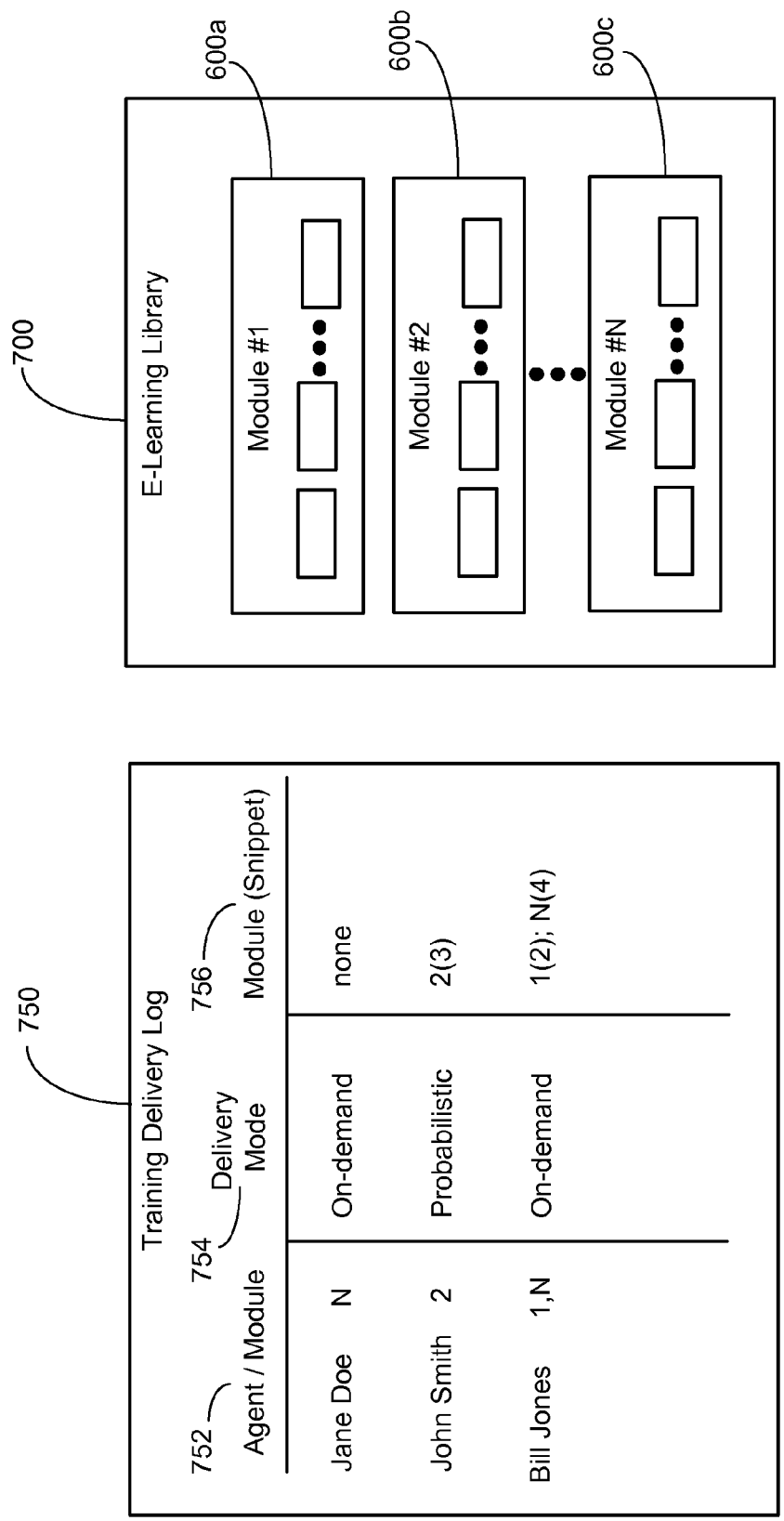
FIG. 7 illustrates data structures that may be associated with the delivery of snippet training data according to one embodiment disclosed herein.

The training server 158 may store and update the training delivery history in a data module along with the training content. Turning to FIG. 7, two embodiments of data structures that may be stored are illustrated. A first data module is an e-learning library 700 (also referred to as a "training module") comprising a number of e-learning modules 600a-600c. Each e-learning module may comprise a number of snippets as previously discussed. The e-learning library represents the training content that can be delivered to agents.

The other data structure is a training delivery log 750. The training delivery log 750 maintains information about what agents should receive which e-learning module, how the e-learning module is to be delivered, and which snippets from the e-learning module have been provided. For example, the first column 752 in the training delivery log 750 may indicate the agent's name and the module number that they are to receive. Although other embodiments may use an agent identifier number, the agent's name is shown for simplicity. This example shows the three agents which were previously identified in the work schedule—Jane Doe, John Smith, and Bill Jones. The number beside each name indicates which modules are to be delivered to each agent. Thus, Bill Jones is to receive e-learning modules 1 and N, and John Smith is to receive e-learning module 2, etc. The delivery mode 754 indicates how the training is to be delivered. In other words, this indicates how the snippets are delivered. In this example, Jane Doe and Bill Jones can request the training on-demand, whereas John Smith receives training on a probabilistic approach.

The last column may indicate the most recent snippet in the module that was delivered to the agent. For example, Jane Doe has not received any modules yet. Thus, the first snippet to be delivered would be Snippet #1 of Module N. John Smith has received Snippet #3 of e-learning Module 2. Bill Jones has received Snippet #2 of e-learning Module 1 and Snippet #4 of e-learning Module N. Other variations are possible. For example, the last column 756 may reflect the next e-learning module to be delivered. In another embodiment, if the snippets in a module can be delivered in random order, then the snippets provided for an agent may be recorded so as to avoid duplicating a particular snippet for that agent. If a snippet is terminated before completion, then that snippet can be indicated as not having been delivered. Thus, the next time conditions allow for triggering an STS with the agent, the same content may be delivered in a subsequent STS.

The training server may also use the training delivery log 750 to record any test scores of the agent associated with an e-learning module. This information may be compared to an acceptable pass rate threshold, which the training module uses to determine whether the e-learning module has been successfully completed. The test results could also be stored n the Training Delivery Log 750, and periodic status reports could be generated for the call center administrator.

It should be apparent that the training server 158 may delivery various independent e-learning modules to agents simultaneously during a work shift, and may deliver different snippets of the same module to various agents in a call center. The e-learning modules may be defined for a shift, an agent, or a group of agents. Various modules may be mixed for different purposes. For example, certain agents could be receiving STS for advancing certain skills, while all agents could be receiving general information via informational formatted snippets.

Training Server

Figure 8:
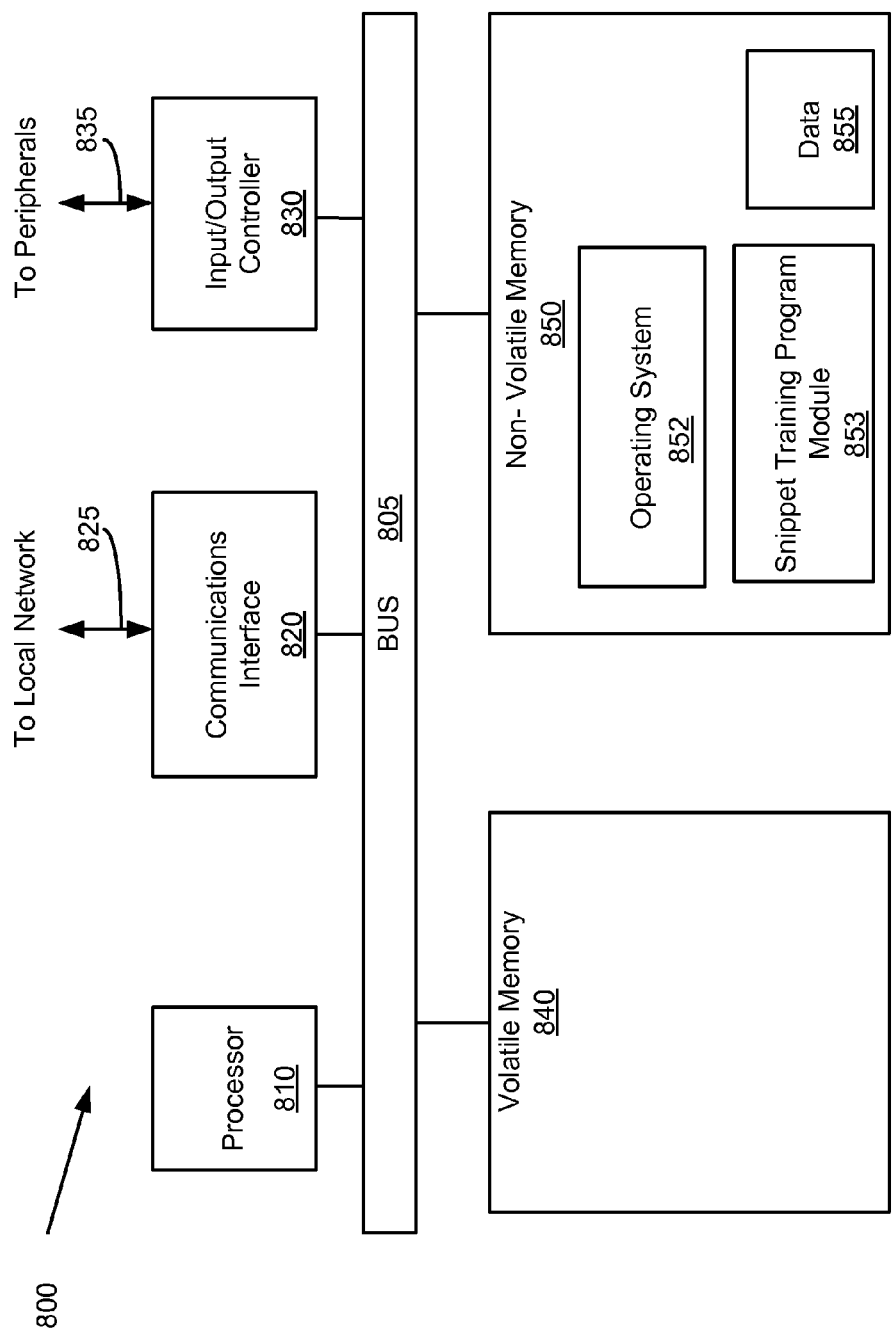
FIG. 8 is an exemplary schematic diagram of a training server used in one embodiment of the call center architecture to practice the technologies disclosed herein.

As discussed in conjunction with FIG. 1, the call center architecture 100 may comprise various components, such as servers, that comprise a processing system. FIG. 8 is an exemplary schematic diagram of a server that may be used in an embodiment of the call center architecture to practice the technologies disclosed herein. FIG. 8 provides an exemplary schematic of a processing system 800, which could represent individually or in combination, for example, the ACD 130, CTI server 145, WFM server 155, agent computer 160a, or other components previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 8, the processing system 800 may include one or more processors 810 that may communicate with other elements within the processing system 800 via a bus 805. The processor 810 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 800 may also include one or more communications interfaces 820 for communicating data via the local network 170 with various external devices, such as other servers of FIG. 1. In other embodiments, communication may be via wired, optical, or wireless networks (or a combination thereof). The interface 825 may use a variety of data transmission protocols, such as fiber distributed data interface (FDDI), Ethernet, asynchronous transfer mode ("ATM"), or frame relay.

The input/output controller 830 may also communicate with one or more input devices or peripherals using an interface 835, such as, but not limited to: a keyboard, a mouse, a touch screen/display input, microphone, pointing device, etc. The input/output controller 830 may also communicate with output devices or peripherals, such as displays, printers, speakers, headsets, banner displays, etc.

The processor 810 may be configured to execute instructions stored in volatile memory 840, non-volatile memory 850, or other forms of computer-readable storage media accessible to the processor 810. The volatile memory 840 may comprise various types of memory technologies, including, but not limited to: random access memory ("RAM"), dynamic random access memory ("DRAM"), static random access memory ("SRAM"), and other forms well known to those skilled in the art. The non-volatile memory 850 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 850 may store program code and data, which also may be loaded into the volatile memory 840 at execution time. Specifically, the non-volatile memory 850 may store one or more snippet training program modules 853 and/or operating system code 852 containing instructions for performing the process and/or functions associated with the technologies disclosed herein. The snippet training program module 853 may also access, generate, or store data 855 in the non-volatile memory 850, as well as in the volatile memory 840. The data 855 may comprise the aforementioned snippet test results, training delivery log, STS parameters, or any other information required in conjunction with delivery of snippet based information to the agent. The volatile memory 840 and/or non-volatile memory 850 may be used to store other information including, but not limited to: records, applications, programs, scripts, source code, object code, byte code, compiled code, interpreted code, machine code, executable instructions, or the like. These may be executed or processed by, for example, the processor 810. These may form a part of, or may interact with, the program module 853.

The technologies described herein may be implemented in various ways, including as computer program products comprising memory storing instructions causing a processor to perform the operations associated with the above technologies. The computer program product may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer-readable storage media include all the above identified computer-readable media (including volatile and non-volatile media), but does not include a transitory, propagating signal. Non-volatile computer-readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. For example, the above description is illustrated in the context of a call center agent handling voice calls, but the calls may encompass non-voice calls. Thus, in terms of agent activities, handling emails, chats, text messaging, and other non-voice related activities may be within the scope of activities handled by an agent, and which pertain to the concepts presented herein. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for providing a snippet training session to an agent of a call center during a work shift of the agent comprising:

storing snippet training data in a memory by a computer, the snippet training data configured to be provided to an agent's computer, wherein the snippet training data is configured to be delivered to the agent during the snippet training session having a time period that is less than a scheduling interval used to schedule the agent during the work shift;

determining a condition triggering initiation of the snippet training session while an agent's workstation is in an available state for processing calls during the work shift;

placing the agent's workstation from the available state to an unavailable state in an automatic call distributor processing calls in the call center, wherein the agent's workstation is precluded from receiving further calls from the automatic call distributor;

delivering the snippet training data to the agent's computer by the computer during the snippet training session, wherein the snippet training session is completed in a time period less than the scheduling interval; and returning the agent's workstation back into the available state after the snippet training session has ended, wherein the agent's workstation is able to receive further calls from the automatic call distributor.

2. The method of claim 1, wherein the snippet training session is not interruptible by the automatic call distributor.

3. The method of claim 1, further comprising:

testing the agent during the snippet training session; and storing a score by the computer resulting from the testing of the agent in conjunction with the snippet training data.

4. The method of claim 1, wherein the snippet training data comprises a plurality of snippet modules linked to form an e-learning module.

5. The method of claim 1, wherein the agent can terminate the snippet training session, and wherein the agent is eligible to receive the snippet training data during a subsequent snippet training session.

6. The method of claim 5, wherein data is recorded by the computer after the subsequent training session indicating the snippet training data was delivered to the agent's computer.

7. The method of claim 1, wherein the condition triggering the snippet training session is a request from the agent for the snippet training session.

8. The method of claim 1, wherein the condition triggering the snippet training session is based on a determination of a duration of the agent working into the work shift.

9. The method of claim 1, wherein the condition triggering the snippet training session is based on a call center performance metric of the agent involving calls processed by the agent.

10. The method of claim 1, wherein the condition triggering the snippet training session is determined by an algorithm executed by the computer resulting in providing the snippet training session to the agent based on a probability distribution curve, wherein the agent is one of a group of agents that can be selected to receive the snippet training session.

11. The method of claim 10, wherein the condition triggering the snippet training session is predicated on determining a call volume of the call center is below a threshold level.

12. A system for providing a snippet training session to an agent in a call center, the system comprising:
an automatic call distributor ("ACD") comprising a processor configured to
maintain a shift schedule for the agent, the shift schedule defined based on using a scheduling interval,
process calls involving the agent during the shift schedule,
place an agent's workstation in an unavailable state in response to receiving an off-line message, and
place the agent's workstation in an available state in response to an on-line message; and
a training server comprising a processing device configured to
present a first indication to an agent's computer that the agent's workstation is in the unavailable state to process calls from the ACD prior to initiation of the snippet training session to the agent,
provide the off-line message to the ACD prior to initiation of the snippet training session to the agent,
provide the snippet training session to the agent's computer, wherein the snippet training session has a duration that is less than the scheduling interval used to schedule the agent,
provide the on-line message to the ACD, and
present a second indication to the agent's computer that the agent's workstation is in the available state after the snippet training session has ended.

13. The system of claim 12, wherein the training server comprises a snippet training program module stored in a memory of the training server that when executed by the processing device causes the processing device to:
determine a condition for triggering the snippet training session based on monitoring a parameter maintained by the ACD regarding performance of the agent; and
in response to determining the condition for triggering the snippet training session, generating the on-line message to the ACD.

14. A computer program product for providing a snippet training session to an agent of a call center, the computer program product comprising a computer-readable storage medium having computer-executable instructions stored therein, the computer-executable instructions configured upon execution by a computer processor to:
store snippet training data in a memory of a computer comprising the computer processor, the snippet training data configured to be delivered to an agent's computer, wherein the snippet training data is configured to be presented to the agent during the snippet training session over a time period that is less than a scheduling interval used to schedule a work shift of the agent;
determine a condition triggering delivery of the snippet training session while a workstation associated with the agent is in an available state for receiving calls during the work shift;
transmit an indication to an automatic call distributor to place the workstation in an unavailable state, wherein the workstation is precluded from receiving subsequent calls from the automatic call distributor;
deliver the snippet training data to the agent by the computer processor during the snippet training session, wherein the snippet training session has a duration less than the scheduling interval; and
return the workstation back into the available state after the snippet training session has ended, wherein the agent is able to receive calls from the automatic call distributor in the call center.

15. The computer program product of claim 14, wherein the computer-executable instructions are configured during execution to further cause the computer processor to not interrupt the snippet training session based on a call volume determined by the automatic call distributor.

16. The computer program product of claim 14, wherein the computer-executable instructions are configured during execution to further cause the computer processor to:
inform the agent of the snippet training session; and
receive confirmation from the agent to proceed with the snippet training session.

17. The computer program product of claim 14, wherein the computer-executable instructions for determining the condition triggering delivery of the snippet training data further cause the computer processor to:
receive an indication from the agent's computer that the agent has requested the snippet training session;
determine using agent-specific data that delivery of the snippet training session to the agent is allowed; and
determine using a volume of calls currently handled by the call center that delivery of the snippet training session to the agent is allowed.

18. The computer program product of claim 14, wherein the computer-executable instructions for determining the condition triggering the snippet training session further cause the computer processor to:
ascertain a duration of the agent working into the work shift;
determine that the duration exceeds a threshold; and
transmit an indication to the agent's computer to inform the agent of the snippet training session.

19. The computer program product of claim 14, wherein the computer-executable instructions for determining the condition triggering the snippet training session further cause the computer processor to:
ascertain an agent performance metric involving calls processed by the agent in the call center during the work shift;
determine that the agent performance metric exceeds a threshold; and
inform the agent of the snippet training session.

20. The computer program product of claim 14, wherein the computer-executable instructions for determining the condition triggering the snippet training session further cause the computer processor to:
- receive an indication of a call center volume;
- determine the call center volume is below a threshold level; and
- select at least one agent from a group of agents using a probability distribution function wherein the at least one agent in the group of agents is the agent to receive the snippet training session.

* * * * *